US010896120B2

(12) United States Patent
Dhanda et al.

(10) Patent No.: US 10,896,120 B2
(45) Date of Patent: Jan. 19, 2021

(54) SYSTEMS AND METHODS FOR MICRO-SCHEDULER TESTING FRAMEWORK

(71) Applicant: Google LLC, Mountain View, CA (US)

(72) Inventors: Sanjeev Dhanda, San Francisco, CA (US); Eric Nickell, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/842,428

(22) Filed: Dec. 14, 2017

(65) Prior Publication Data

US 2018/0267884 A1 Sep. 20, 2018

Related U.S. Application Data

(60) Provisional application No. 62/472,192, filed on Mar. 16, 2017.

(51) Int. Cl.
*G06F 11/36* (2006.01)
(52) U.S. Cl.
CPC ........ *G06F 11/3664* (2013.01); *G06F 11/368* (2013.01); *G06F 11/3684* (2013.01); *G06F 11/3688* (2013.01)
(58) Field of Classification Search
CPC .................................................. G06F 11/368
USPC ........................................................ 717/124
See application file for complete search history.

(56) References Cited

U.S. PATENT DOCUMENTS

| 6,606,721 | B1* | 8/2003 | Gowin, Jr. | ...... G01R 31/318385 |
| | | | | 714/728 |
| 9,027,004 | B1* | 5/2015 | Johnson | .................... G06F 8/41 |
| | | | | 717/140 |
| 2005/0044531 | A1 | 2/2005 | Chawla et al. | |
| 2007/0006041 | A1* | 1/2007 | Brunswig | ........... G06F 11/3688 |
| | | | | 714/38.14 |
| 2012/0233287 | A1* | 9/2012 | Queru | ..................... H04L 67/06 |
| | | | | 709/217 |
| 2014/0026144 | A1* | 1/2014 | Pack | ....................... G06F 9/505 |
| | | | | 718/105 |

(Continued)

OTHER PUBLICATIONS

International Search Report and Written Opinion dated Mar. 27, 2018 in PCT Application No. PCT/US2017/066433.

(Continued)

*Primary Examiner* — Chat C Do
*Assistant Examiner* — Bradford F Wheaton
(74) *Attorney, Agent, or Firm* — Lerner, David, Littenberg, Krumholz & Mentlik, LLP

(57) ABSTRACT

Methods and systems for an automated micro-scheduler testing framework that allows tests to be automatically scheduled or rescheduled based on information such as results of previously-executed tests or other external information are provided. In large-scale development environments, where individual changes to a code repository cannot be specifically fully tested due to scalability and resource issues, micro-scheduler servers may be configured and designed to automatically identify target tests and request that the target tests be executed by a continuous integration system to automatically identify and resolve breakages introduced into a codebase managed by the continuous build system in a large-scale environment.

10 Claims, 5 Drawing Sheets

(56) References Cited

U.S. PATENT DOCUMENTS

2015/0261658 A1* 9/2015 Douglas .............. G06F 11/3688
714/38.1
2018/0006913 A1* 1/2018 Asenjo ................... H04L 67/10

OTHER PUBLICATIONS

Elbaum, Sebastian, et al. "Selecting a Cost-Effective Test Case Prioritization Technique" Software Quality Journal, vol. 12, No. 3, pp. 185-210, Sep. 2004.

* cited by examiner

SYSTEMS AND METHODS FOR MICRO-SCHEDULER TESTING FRAMEWORK

RELATED APPLICATIONS

The present application claims priority to U.S. Provisional Application No. 62/472,192 filed on Mar. 16, 2017 and titled "SYSTEMS AND METHODS FOR MICRO-SCHEDULER TESTING FRAMEWORK," which is herein incorporated by reference in its entirety for all purposes.

BACKGROUND

Release management is the process of managing, planning, scheduling, and controlling a software release through different development stages and environments. The release management process includes, inter alia, building, testing and deploying multiple software versions. The development process is facilitated through a version control system that manages changes to source code files and other files that are provided to the code repository.

The version control system provides changelists for code commits. A code commit is the act of making a set of tentative changes permanent, for example, when a developer commits revised code to a code repository using the version control system. A changelist is a set of changes to code files and other related files that should be treated as an indivisible group. The changes in a changelist represent a logical change in source code and may alter the functionality and behavior of the code. The version control system can provide a consistent view of all the committed changes to a repository at any point in the repository's history. As a result, although there may be 2000 sequential commits in the repository, developers and/or tools can at any time view the state of the repository after an arbitrary number, for example, 512, of commits.

The development process may further be facilitated though a continuous integration system. The continuous integration system, also referred to as a continuous build system, verifies code committed/checked-in to the code repository using an automated build process. The automated build process builds the committed code on a continuous integration (CI) server(s) and runs unit and integration tests on the build. If the unit and integration tests are successful, the CI server informs the developer team of the successful build and may release the build. If the build or tests fail, the CI server alerts the team, who is tasked with identifying and fixing the problem code. The code release is on hold until the development team corrects the errors.

A conventional automated testing framework for deploying changes to an active codebase via a release management system is to submit each changelist, generate a software build integrating the changes from the changelist(s), and execute all tests against the generated software build. If all the tests are successful, the code repository updates the version of the software code to include the tested changelist(s). If any test fails, the changelist is rejected and the changes are not incorporated into the stable version of the software code. Although this conventional automated testing framework improves code error detection by automatically running all tests against each build, as the size of the code base increases over time the amount of time and effort necessary to run all tests against each submitted changelist individually becomes impossible or enormously time consuming. Thus the conventional approach is no longer practical or sustainable. In addition, the amount time need for developers to identify and fix code errors in response to failed test also increases.

One approach to mitigate the above problem is to apply partial testing within the continuous integration environment. This approach is generally automated and attempts to limit the number of tests that are run against active builds based on predefined criteria. Although this system may reduce the time for testing, it has impact on the time required to identify and fix errors based on failed tests. In addition, it introduces an extra potential cost where the time/resources to identify the tests to be run may be outweighed by any gain from the reduced number of tests.

SUMMARY

A problem with the existing testing frameworks and methods described above, where all tests or partial tests are run against a build incorporating submitted changelists, is determining which of the failed tests and specific changelists are relevant when identifying the cause of a test failure. As more tests are run, and potentially fail, the increasing number of tests exacerbate the challenge of identifying and resolving bugs in an active build that is actively receiving submitted changelists. As recognized by the inventors, what is needed is a scalable automated testing framework for scheduling and/or rescheduling of tests for execution in a continuous integration environment.

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

According to one aspect, the disclosure relates to a testing automation platform for scheduling and/or rescheduling tests for execution in a continuous integration environment. The continuous integration environment includes a code repository and at least one continuous integration server that periodically generates software builds based on committed code changes, executes queued tests on the generated builds, and reports results to developers. The testing automation platform includes a test scheduler server configured to identify and queue tests to be run on a build based on code changes committed to the code repository. The testing automation platform also includes at least one micro-scheduler server configured to listen to at least one information stream from the continuous integration environment and analyze information received from the at least one stream based on predefined rules designed to achieve an assigned goal. The micro-scheduler server is also configured to identify one or more target tests based on the analysis and prioritize the identified one or more target tests based on the micro-scheduler server's assigned goal. The micro-scheduler is also configured to create test execution requests for the prioritized target tests and provide the test execution requests to a micro-scheduler service. The testing automation platform also includes a micro-scheduler service configured to receive test execution requests from the at least one micro-scheduler server and select which tests to queue for execution based on available resources and the received test execution requests.

According to certain aspects, the disclosure relates to a method of automated identification of target tests for execution in a continuous integration environment. The continuous integration environment includes a code repository and at least one continuous integration server that periodically generates software builds based on committed code changes, executes queued tests on the generated builds, and reports results to developers. The method includes listening to at least one information stream from the continuous integration environment and analyzing the information from the at least one information stream based on predefined rules designed to achieve an assigned goal. The method also includes identifying one or more target tests based on the analysis and prioritizing the identified one or more target tests based on the micro-scheduler's assigned goal. The method includes creating one or more test execution requests for the prioritized target tests and providing the one or more test execution requests to a micro-scheduler service. The micro-scheduler service decides which of tests to queue for execution by the continuous integration environment based on available resources and other pending test execution requests.

According to certain aspects, the disclosure relates to a method of automated scheduling or re-scheduling test for execution in a continuous integration environment. The continuous integration environment includes a code repository and at least one continuous integration server that periodically generates software builds based on committed code changes, executes queued tests on the generated builds, and reports results to developers. The method includes periodically receiving, from one or more micro-scheduler servers, a plurality of a test execution requests. Each test execution request identifies at least one test to be run by the continuous integration server and a score assigned by the requesting micro-scheduler server. The method includes filtering the received test execution requests to remove harmful and/or redundant requests and prioritizing the filtered requests for each micro-scheduler server based on their respective assigned score and available system resources. The method includes placing the prioritized requests in one or more queues for execution and submitting specific test requests to the continuous integration server for execution based on the queued requests.

In some implementations, the micro-scheduler service may be further configured to filter the received requests to remove duplicate requests. In some implementations, the testing automation platform includes an application program interface (API) which defines how micro-scheduler servers interface with the micro-scheduler service and allows third parties to independently develop micro-scheduler servers. In some implementations, the testing automation platform includes a plurality of micro-scheduler servers. In some implementations, the assigned goal of one of the plurality of micro-scheduler servers is identifying changelists causing a breakage or failed test. In some implementations, the assigned goal of one of the plurality of micro-scheduler servers is identifying changelists which caused a breakage and/or identifying changelists causing an unstable codebase. In some implementations, the assigned goal of one of the plurality of micro-scheduler servers is identifying flaky tests.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1A:
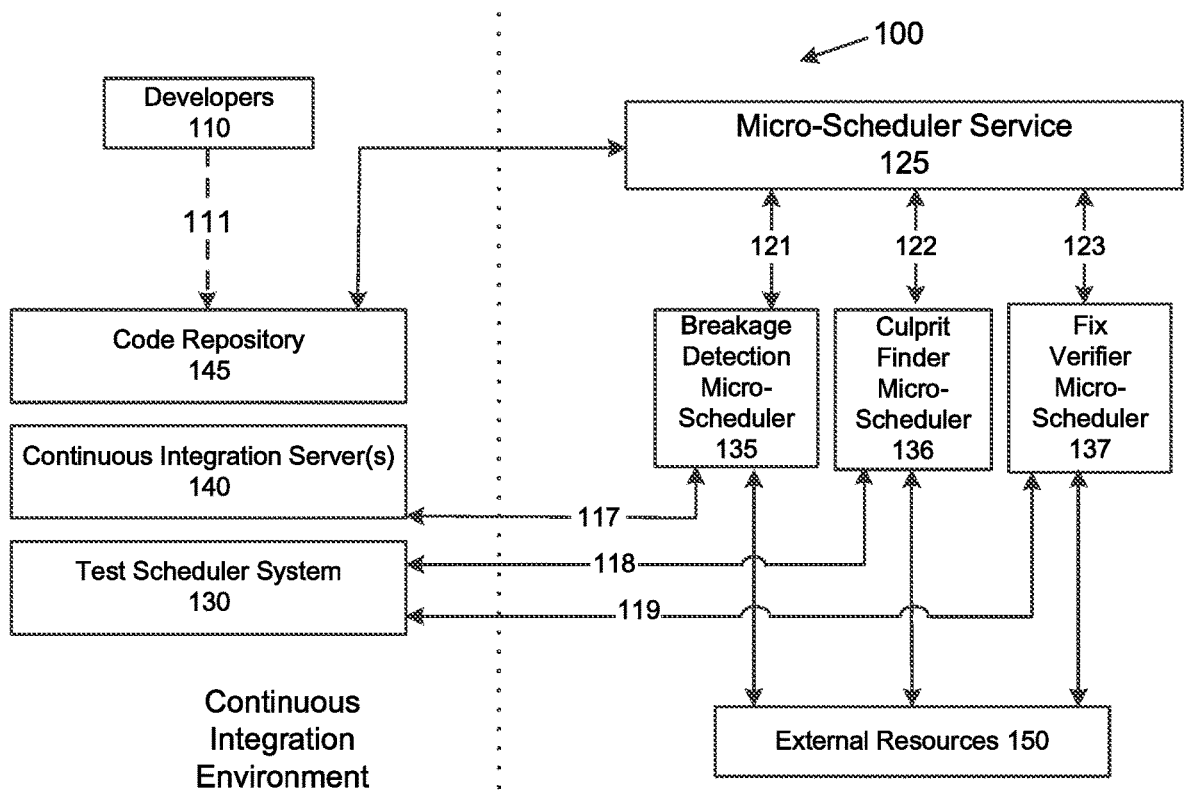
FIG. 1A is a block diagram illustrating an example testing automation platform according to one or more embodiments described herein.

The headings provided herein are for convenience only and do not necessarily affect the scope or meaning of the claims.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples and embodiments. One skilled in the relevant art will understand, however, that the various embodiments described herein may be practiced without many of these details. Likewise, one skilled in the relevant art will also understand that the various embodiments described herein can include many other obvious features not described in detail herein. Additionally, some well-known structures or functions may not be shown or described in detail below, so as to avoid unnecessarily obscuring the relevant description.

An example embodiment is a testing automation framework that allows customized scheduling and/or rescheduling of tests for builds managed by a continuous build system. FIG. 1A is a block diagram illustrating an example testing automation platform 100 within a continuous integration environment according to an embodiment. The continuous integration environment includes developers 110, changelists 111, a code repository 145, at least one continuous integration server 140, and a test scheduler system 130. The testing automation framework 100 also includes a micro-scheduler service 125, one or more micro-scheduler servers 135-137, and external resources 150. Although three micro-schedulers are shown in FIG. 1A the testing automation framework may include a single micro-scheduler or any number thereof.

Developers 110 may submit changelists 111 to the code repository 145. A changelist 111 may represent a set of changes to one or more source code files, configuration files, binary files, or other types of data files which alter the state of the codebase maintained in the code repository 145. The continuous integration server(s) 140 maintains and generates builds from the codebase managed by the code repository 145. Based on the environment configuration, the build generation may be dynamic or on a periodic basis. The test scheduler system 130 queues tests to be run against the builds generated by the continuous integration server 140. Also, based on the environment and configuration, the test scheduler system 130 may queue tests to be run against the build dynamically as changelists are received or periodically based on available system resources. The example embodiment illustrated in FIG. 1A shows a code repository 145, continuous integration server 140, and test scheduler system 130 as a single integrated unit for simplicity only, as these elements may be independent from each other and distributed in multiple locations. In addition, the continuous integration server 130 is shown as a single server for simplicity only, as the functionality provided thereby may be implements in a plurality of servers distributed in multiple locations.

The testing automation framework 100 includes a micro-scheduler service 125 and at least one micro-scheduler server, such as one of micro-scheduler servers 135-137. The micro-scheduler service 125 receives requests to run test on specific builds from the micro-scheduler servers 135-137 and decides which of the received requests to queue for execution by the continuous integration server 140 based on available resources and other pending test execution requests. The micro-scheduler servers 135-137 receive information streams from the continuous integration environment and generate requests to schedule or reschedule tests for execution based on various information, such as: monitored information streams 117-119 from the code repository 145, continuous build system 140, test scheduler system 130, or external resources 150. In addition, the micro-schedulers may automatically roll-back code change in changelist identified as causing code breakages.

The micro-scheduler servers 135-137, also referred to herein as a micro-scheduler, are configured to monitor information from the continuous integration environment and execute a predefined set of rules to achieve their assigned goal/metric. The three example micro-schedulers shown in FIG. 1A focus on three areas: breakage detection 135, culprit finding 136, and fix verification 137.

Although FIG. 1A illustrates an example of separate micro-schedulers, this separation is for illustration purposes only and should not be construed to limit the testing framework as the example micro-schedulers may be combined into a single micro-scheduler server or separated into multiple micro-scheduler servers. Also, in some implementations, sets of micro-schedulers may work in conjunction with each other to detect breakages, resolve the detected breakages, and then verify the resolved breakage has actually been resolved. The generic structure of each micro-scheduler is shown in FIG. 1B.

Figure 1B:
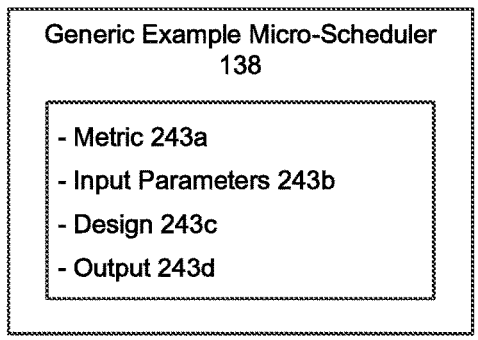
FIG. 1B is a diagram illustrating the attributes of a generic micro-scheduler.

FIG. 1B is a diagram illustrating the attributes of a generic micro-scheduler. As shown in FIG. 1B, the generic micro-scheduler 138 is configured with a number of functional attributes such as a performance metric 243a, one or more input parameters 243b, a design 243c, and an output 243d. The performance metric 243a of a particular micro-scheduler is a specific goal that the micro-scheduler is designed to meet. Some non-limiting examples of micro-scheduler performance metrics are: reducing the time to repair a changelist, decreasing the down-time of projects due to flaky errors, and reducing the amount of time that a build is in an error state, informing a code change author that their submission caused a failure, and automatically rolling back changes that have caused a failure.

Micro-scheduler input parameters 243b may include input parameters such as streams of information 117-119 that may contain execution information from tests performed by the test scheduler system 130. The input parameters 243b may also include information about previous requests made by the micro-scheduler or characteristics of changelists 111 submitted to the code repository 145, such as the files impacted, the submitter of the files, and comments from reviewers. The input parameters 243b may also include status information of the builds managed by the continuous build system 140. Input parameters 243b may also include information from external sources 150 such as databases, services, or networks that may determine the behavior of the micro-scheduler.

The micro-scheduler design 243c describes how a micro-scheduler processes information streams, creates requests to run tests, and performs any post-processing activity following the submission and/or execution of requested tests. More specifically, the design 243c represents one or more pre-defined rules that a micro-scheduler executes to achieve its intended goal/metric. These predefined rules allow the micro-scheduler to automatously monitor the continuous integration environment and to analyze data in order to achieve its assigned goal as discussed in more detailed below with respect to example micro-scheduler servers.

The micro-scheduler output 243d includes test execution requests 121-123, as well as other information helpful in identifying and correcting errors in the code base which may be provided to external resources 150 and/or the continuous integration environment. The test execution requests are requests to run a particular test on a particular build. Each test execution request 121-123 may include an identifier, a build target, build flags, changelist tuples, timestamps, expiration periods, and a score. Some attributes may be optional, and additional parameters may be defined based on the design of the micro-scheduler.

The score output 243d parameter or attribute of a test request defines the importance or priority of the request in relation to other test execution requests submitted by a micro-scheduler. The priority assigned to a test request may be based on the micro-scheduler's design and or goal/metric. For example, take the scenario where a particular test is run by the continuous integration server at t=1000, where the value of t identifies a certain point in time that is associated with a snapshot of the code repository. In this example, assume that at t=1000 the snapshot of the code repository has passed all previously applied tests. However, when the test is run again at t=9000 the snapshot of the code fails. In this scenario, also assume that it is known that this particular test could only have changed state at t=2000, 3000 . . . 8000. Let's also assume that a micro-scheduler server, such as micro-scheduler server 137 shown in FIG. 1A, decided to request that the particular test be run against each of the intervening snapshots, i.e., snapshots at t=2000, t=3000, . . . , 8000, in order so that the developer responsible for correcting/clearing the test failure can identify where the code error was introduced based on the results of each snapshot. In this scenario, the micro-scheduler server, such as the generic micro-scheduler server 138 shown in FIG. 1B, may prioritize and/or score some of the requests to run tests against snapshots more highly than others. For example, the request which best splits the problem in half (e.g., identifying which changelist resulted in the introduced error) is t=5000. Although running the tests at all the target snapshots may be desirable, running all the requested test is not feasible due to resource and time restrictions. Therefore, it makes sense to prioritize running the test against the snapshot at t=5000 above all other snapshot test runs because it splits the problem in half. This prioritizing may be based on the micro-scheduler server 138's goal, for example a culprit finder micro-scheduler, such as micro-scheduler 136, may rate snapshots that best split a problem at the 50% mark as the highest priority, and snapshots at the 25% and 75% marks as the next highest.

In some implementations, the micro-scheduler server 138 may continuously ask for a test to be run for the last known repository snapshot whose last status indicated that the test failed. The snapshot number, which is always increasing, may be used as the priority so that a micro-scheduler service 125 may grant the most recent request first since the most recent request may have the highest number.

In some implementations, for all currently-failing tests, each time the tests appear to be affected by a repository change, a request may be made to run the tests on the affected snapshot. The priority of the request may be chosen based on the largest power of two which evenly divides any integer in the range between the affected snapshot number and the previously-affected snapshot number. A micro-scheduler server 138 may determine this score based on criteria to achieve its goals. For example, a breakage-detector micro-scheduler server 138 may submit a test request with a greater score to address a compiler breakage which is a higher priority, and a lower score for test requests to address failed tests which are a lower priority.

A breakage detection micro-scheduler 135 focuses on identifying breakage-causing changelists or errors within a submitted changelist that cause the codebase to become unstable. Types of breakages may include: compiler breakages, i.e. changes to the codebase that result in the code being unable to compile successfully or failed tests, i.e. changes that still allow the code to compile, but nevertheless contain errors in logic or execution rendering the build unstable. Generally, compiler breakages are more serious than failed tests because they have a broader negative impact on the codebase. A compiler breakage, therefore, is given higher priority and must be prevented or resolved as soon as possible to maintain the stability of the codebase. A third type of breakage is a configuration breakage which makes the continuous build system unable to determine what tests to run or how to run them.

A culprit finding micro-scheduler 136 focuses on isolating and identifying areas of code in submitted changelists causing breakage or failed tests in the active codebase. The goals of these micro-schedulers are to identify the type of breakage and if possible, locate, isolate, and resolve the cause of the breakage to allow a successful build or successful execution of a test against a build.

A verifying fix micro-scheduler 137 focuses on determining whether a previously detected breakage or failed test has been resolved. The purpose of this type of micro-scheduler is to let developers know when a snapshot of the code repository contains a version of software that is safe to be exported to production services. It can also inform developers that it is again safe to submit other changes to the repository, which may have been blocked while a previous breakage was unresolved.

Additional example micro-scheduler servers may include a "deflaker" micro-scheduler server (not shown). A "flake" is a test run for a specific repository snapshot which fails, but when re-executed against the same snapshot passes. When a test which has been flaky in the past fails, an example deflaker micro-scheduler may request that the test be run again against the same repository snapshot to see if that particular failure was a "flake." The deflaker micro-scheduler server may periodically request to rerun tests (either passing or failing) at repository snapshots where they have already been run strictly for the purpose of gaining knowledge about the flakiness of a test. In some implementations, there may be a flakiness culprit finder micro-scheduler server that may attempt to isolate the specific repository snapshot which made the inconsistent behavior of the test more prevalent.

Another example micro-scheduler server is a heat seeker micro-scheduler server (not shown) which may detect a submitted changelist to the code repository 145 and create test execution requests for tests determined to be "hot spots" in a system, i.e. tests which have a high rate of failure. This provides a developer with earlier notice of a potential test failure, conserving time and system resources, compared to a subsequent, full test run by the continuous integration server 140. In addition, a heat-seeking micro-scheduler may periodically examine the last N hours of results, where N may be 24, 48, or 168 hours, in order to identify tests which have failed at any point during that period. Tests which transition from pass to fail during a recent period may be more likely to transition again from pass to fail in the near future. In some implementations, the heat seeker micro-scheduler server may not use any information from the changelist itself except basic knowledge that a test could have been affected by the source code changes included in the changelist. Although described as separate implementation, a heat seeker micro-scheduler may also be a breakage detection micro-scheduler.

One of the advantages of the testing automation platform 100 is that it allows third parties to design and implement micro-scheduler servers to achieve a desired goal/metric. This is achieved by providing an application program interface (API) which defines how a micro-scheduler server, such as micro-scheduler server 138, interfaces with a micro-scheduler service, such as micro-scheduler service 125. Therefore, the example micro-scheduler servers described above should not be construed to limit the scope of micro-scheduler servers in general.

Figure 2:
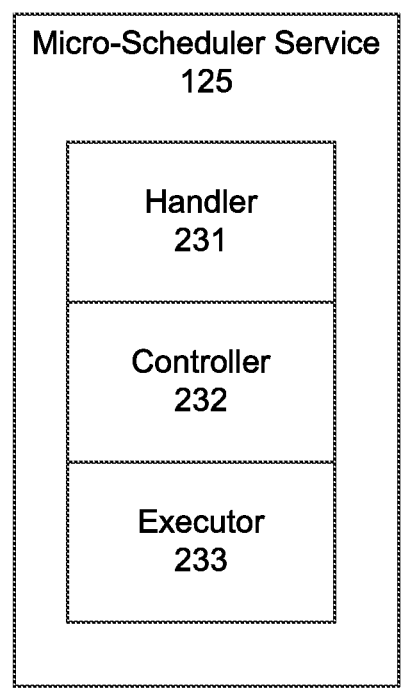
FIG. 2 is a block diagram illustrating a micro-scheduler service according to one or more embodiments described herein.

FIG. 2 is a diagram illustrating an example micro-scheduler service 125, for example in a testing automation platform 100 such as that shown in FIG. 1A. The micro-scheduler service 125 includes a micro-scheduler request handler 231, a micro-scheduler request controller 232, and a micro-scheduler request executor 233. The micro-scheduler service 125 may be configured as a single, master service which has been elected or may be configured as distributed arrangement of multiple micro-scheduler services. In some implementations, micro-scheduler service may run on geographically distributed machines for redundancy. In some implementations, the micro-scheduler servers may vote to elect one of the micro-scheduler servers to operate as a master micro-scheduler service while the other micro-scheduler servers operate in a stand-by mode to do the work if the elected micro-scheduler server fails for any reason. In some implementations, a single micro-scheduler service 125 may be distributed across many machines sharing the same workload. The micro-scheduler service 125 may provide monitoring to support assessing the micro-scheduler service's 125 health. For example, the micro-scheduler service 125 may include debugging capabilities to diagnose errors when performance issues or errors arise. In some implementations, the debugging capabilities may also diagnose user and system data as well as data related to the micro-scheduler service 125's configuration.

The micro-scheduler service handler 231 receives test execution requests 121-123 from various micro-scheduler servers 135-137 and processes the received requests to determine whether they should be queued for the executor 233. According to one or more embodiments the handler 231 determines whether the received requests 121-123 are harmful to the micro-scheduler service 125 or other components within the continuous integration environment such as the test scheduler system130, the continuous integration servers 140, and/or the code repository 145. This is due in part to the fact that the micro-scheduler server 138 may be a standalone server designed that is maintained by third party developers. As part of its processing, the handler 231 ensures that received test execution requests 121-123 include the required parameters, for example a parameter which includes an appropriate expiration value, such as one hour, after which a received request 121-123 will be cancelled or terminated. The handler 231 may also perform de-duplication, in cases where identical tests are requested from multiple micro-scheduler servers 138. In some implementations, when multiple requests for the same test are received from a micro-scheduler server 138, the test execution request with the most recent timestamp will be retained and the other pending duplicate requests will be cancelled or ignored. The handler 231 may also maintain priority queues of test execution requests 121-123 received by the micro-scheduler servers 135-137 based on predefined factors, for example to preclude one micro-scheduler server from consuming too many resources, or to deprioritize requests received from poorly performing micro-scheduler servers that fail to meet their goals. In other embodiments individual queues may be provided for each micro-scheduler server to queue the requests received from the respective micro-scheduler server.

By design, micro-scheduler servers 138 may be permitted to send more requests to the micro-scheduler handler 231 than the micro-scheduler service 125 could possibly grant. Therefore, for each micro-scheduler server 135-137, the handler 231 may calculate how many requests should be granted based on the available resources, and may remove the calculated number of requests from the micro-scheduler server's individual queue. The handler 231 may provide the removed requests to the executor 233 to be provided to the run queue of the continuous integration server 140. The handler 231 may also maintain expiration times for the requests. In some implementations, there may be a maximum expiration time. If a micro-scheduler server exceeds the number of requests that the handler 231 is able to grant within the maximum expiration period, the handler 231 may remove the lowest-priority requests from the micro-scheduler server's queue. This process protects the micro-scheduler service 125 from a malicious micro-scheduler.

The micro-scheduler service controller 232 maintains rate limits for the micro-scheduler servers 135-137. The controller 232 may also maintain available buffer values to manage utilization of system resources to guard against exceeding certain system capacities which may undermine other aspects of the system, such as the continuous build system 140 or the test scheduler system 130.

The micro-scheduler service executor 233 requests specific tests to be run in the test scheduler system 130 based on the test execution requests processed by the handler 231. Test execution may be done periodically or on demand based on the micro-scheduler service's 125 configuration. The executor 233 may transform the received test execution requests 121-123 so that the requests may be submitted to the test scheduler system 130. The executor 233 may evaluate the idleness and availability of micro-scheduler servers 135-137 to optimize scheduling performance. The executor 233 may also determine and manage the cost of executing the test requests 121-123. In some implementations, the executor 233 may also perform optimizations, such as batching and pipelining test requests to improve its performance and/or efficiency. In some implementations, the executor 233 may also implement filtering to screen out duplicate or expensive test requests 121-123. In some implementations, the executor 233 may monitor, terminate, or suspend test requests 121-123 for security, performance and/or efficiency reasons.

Figure 3A:
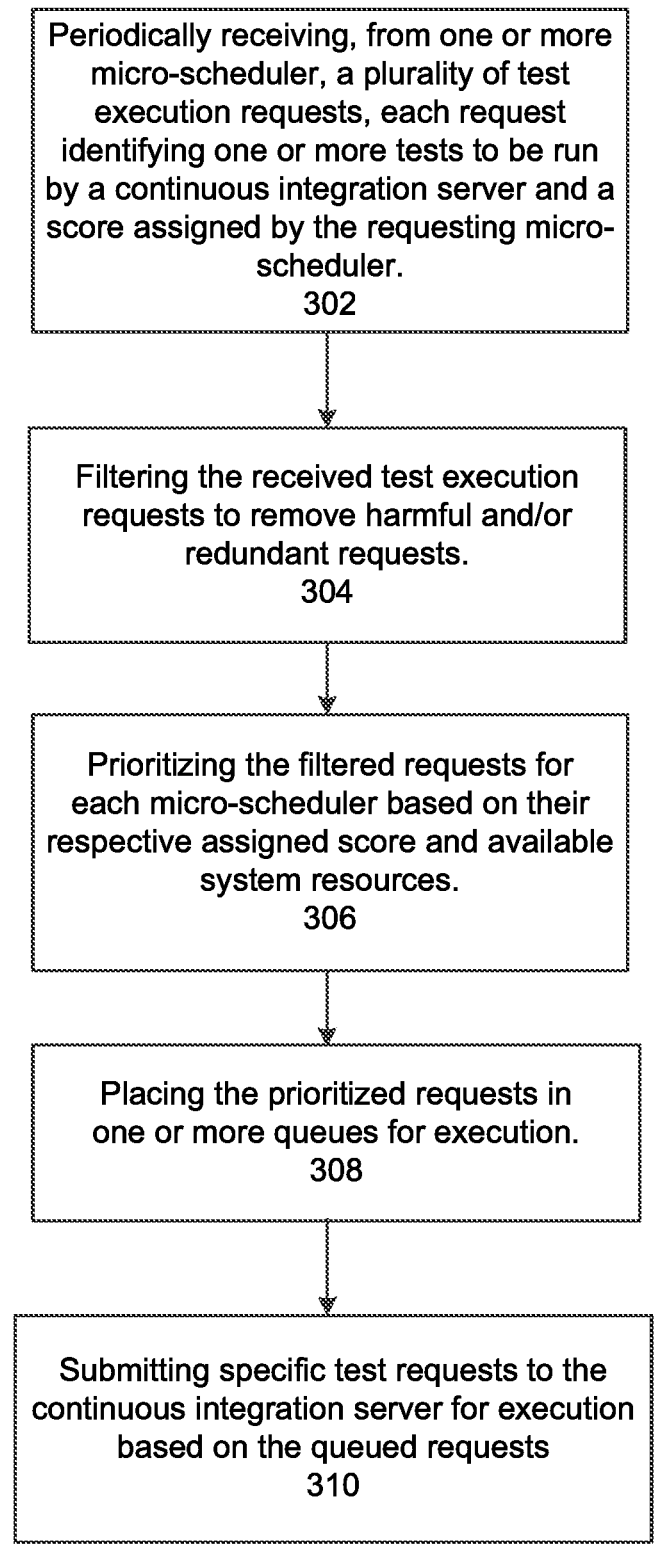
FIGS. 3A and 3B are flowcharts illustrating example processes for automated testing in a continuous integration environment according to one or more embodiments described herein.

FIG. 3A is a flowchart showing an exemplary method of automated scheduling and/or rescheduling of tests for execution in a continuous integration environment, which may be performed, for example using a testing automation platform 100 as shown in FIG. 1A. The process begins in step 302, with a micro-schedule service 125 periodically receiving, from one or more micro-scheduler servers 135-137, a plurality of a test execution requests 121-123 identifying one or more tests to be run by a continuous integration server 140, each request including a score assigned by the requesting micro-scheduler server. In step 304, the micro-scheduler service 125 filters the received test execution requests to remove harmful and/or redundant requests. In step 306, the micro-scheduler service 125 prioritizes the filter tests requests based on their respective assigned score and available system resources. In step 308, the micro-scheduler service 125 places the prioritized requests in one or more queues for execution. In step 310, the micro-scheduler service 125 submits specific test requests to the continuous integration server 140 for execution based on the queued requests.

Figure 3B:
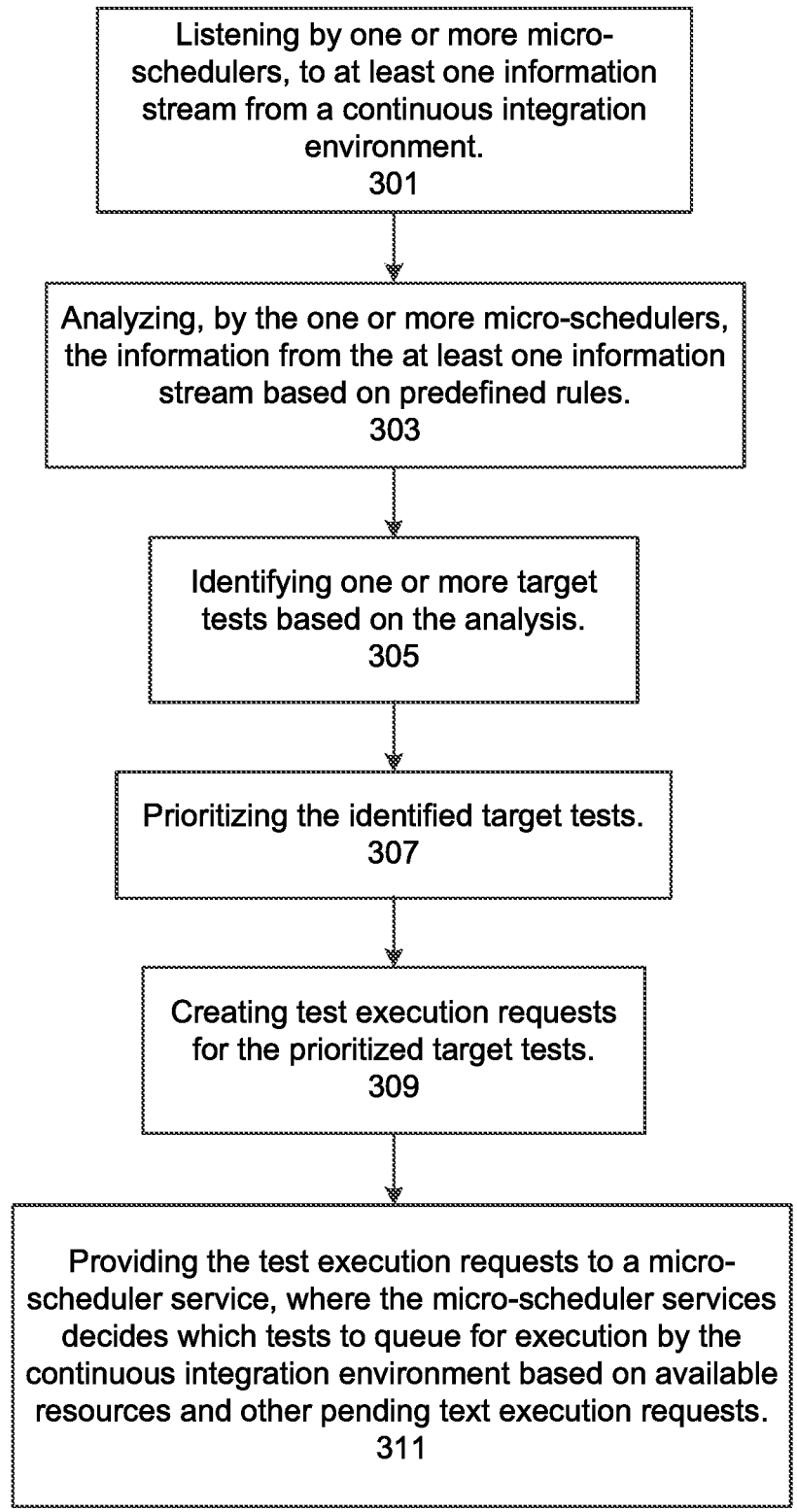

FIG. 3B is a flowchart showing an exemplary method of automated identification of target tests for execution in a continuous integration environment, which may be performed, for example using an testing automation platform 100 such as that shown in FIG. 1A. The process begins in step 301, with one or more micro-scheduler servers 135-137 listening to at least one information stream 117-119 from a continuous integration environment. In step 303, the one or more micro-scheduler servers 135-137 analyze the information received from the at least one information stream based on predefined rules associated with the one or more micro-schedulers. In step 305, target tests are identified based on the analysis and prioritized based on the micro-scheduler's assigned goals in step 307. In step 309, the one or more micro-schedulers 135-137 create test execution requests 121-123 for the prioritized target tests. Then, in step 311, the test execution requests are provided to a micro-scheduler service 125, where the micro-scheduler service 125 decides which test to queue for execution by the continuous integration environment 140 based on the assigned prioritization, available resources, and other pending text execution requests. For example, the micro-scheduler service 125 may determine the amount of capacity to give a micro-scheduler server and then select those tests that fit in the determined capacity from the micro-scheduler server's queue of highest priority requests.

Figure 4:
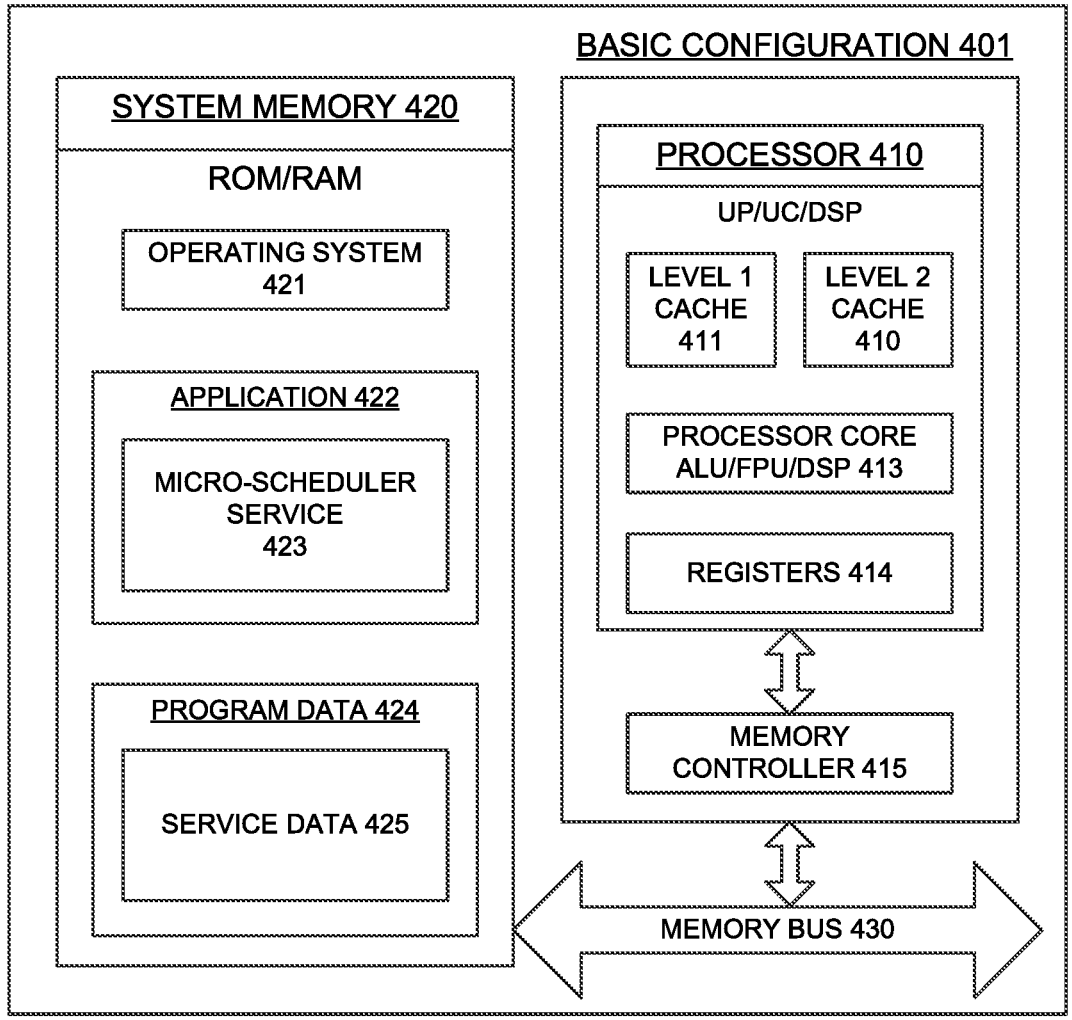
FIG. 4 is a block diagram illustrating an example server.

FIG. 4 is a high-level block diagram of an example server 400 that is arranged to allow target tests to be identified and scheduled or rescheduled for execution by a continuous integration environment based on information such as results of previously-executed tests or other external information. In a very basic configuration 401, the computing device 400 typically includes one or more processors 410 and system memory 420. A memory bus 430 can be used for communicating between the processor 410 and the system memory 420. The application 422 may include one or more micro-scheduler servers 135-137 for identifying target tests and requesting their execution.

Depending on the desired configuration, the processor 410 can be of any type including but not limited to a microprocessor ($\mu$P), a microcontroller ($\mu$C), a digital signal processor (DSP), or any combination thereof. The processor 410 can include one more levels of caching, such as a level one cache 411 and a level two cache 412, a processor core 413, and registers 414. The processor core 413 can include an arithmetic logic unit ALU, a floating point unit FPU, a digital signal processing core DSP Core, or any combination thereof. A memory controller 415 can also be used with the processor 410 or in some implementations the memory controller 415 can be an internal part of the processor 410. In more detail, the processor 410 may be any logic circuitry that processes instructions, e.g., instructions fetched from the memory 420. In many embodiments, the processor 420 is a microprocessor unit or special purpose processor. The computing device 400 may be based on any processor, or set of processors, capable of operating as described herein. The processor 410 may be a single core or multi-core processor. The processor 410 may be multiple processors. In some implementations, the processor 410 can be configured to run multi-threaded operations. In some implementations, the processor 410 may host one or more virtual machines or containers, along with a hypervisor or container manager for managing the operation of the virtual machines or containers. In such implementations, the method shown in FIGS. 3A and 3B can be implemented within the virtualized or containerized environments provided on the processor 410.

Depending on the desired configuration, the system memory 420 can be of any type including but not limited to volatile memory (such as RAM), non-volatile memory (such as ROM, flash memory, etc.) or any combination thereof. The system memory 420 may be any device suitable for storing computer readable data. The memory 420 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). The computing device 400 may have any number of memory devices 420. In some implementations, the memory 420 supports virtualized or containerized memory accessible by virtual machine or container execution environments provided by the computing device 400. System memory 420 typically includes an operating system 421, one or more applications 422, and program data 424.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an internetwork (e.g., the Internet), and peer-to-peer networks (e.g., ad hoc peer-to-peer networks).

Application 422 includes instructions, that when executed by the one or more processors implement a system and method for scheduling and/or rescheduling tests for execution in a continuous integration environment, such as a micro-scheduler service 423. Program Data 424 includes service data 425. Service data 425 may include data such as information streams 117-119 and/or data received from external resources 150. In some implementations, application 422 may be arranged to operate with program data 424 on an operating system 421.

The computing device 400 can have additional features or functionality, and additional interfaces to facilitate communications between the basic configuration 401 and any required devices and interfaces.

System memory 420 is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of the computing device 400.

The computing device 400 can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device 400 can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A testing automation platform for scheduling and/or rescheduling tests for execution in a continuous integration environment, the continuous integration environment including a code repository and at least one continuous integration server that periodically generates software builds based on committed code changes, executes queued tests on the generated builds, and reports results to developers, the testing automation platform comprising:
   a test scheduler server comprising a first processor configured to queue tests to be run on a build based on code changes committed to the code repository, wherein a committed code change comprises a previously temporary code change that has been made permanent;
   a plurality of micro-scheduler servers, each micro-scheduler server comprising a second processor configured to:
      listen to at least one information stream from the continuous integration environment;
      analyze information received from the at least one information stream based on predefined rules designed to achieve an assigned goal, wherein each micro-scheduler server is assigned a respective goal;
      identify one or more target tests based on the analysis of the information received from the at least one information stream;
      assign a priority level to each of the identified one or more target tests based on the micro-scheduler server's respective assigned goal;
      selectively create test execution requests for one or more of the identified target tests based on the assigned priority levels; and
      provide the test execution requests to a micro-scheduler service; and
   the micro-scheduler service, wherein the micro-scheduler service comprises a third processor configured to:
      receive the test execution requests from the plurality of micro-scheduler servers;
      determine an amount of system resources available to each micro-scheduler server;
      select which tests to queue for execution based on the amount of available resources for each respective micro-scheduler server and the assigned priority levels of the received test execution requests; and
      provide the selected tests to the test scheduler server to be queued for execution by the continuous integration server.

2. The testing automation platform according to claim 1, wherein the third processor of the micro-scheduler service is further configured to filter the received requests to remove duplicate requests.

3. The testing automation platform according to claim 1, further comprising:
   an application program interface (API) which defines how micro-scheduler servers interface with the micro-scheduler service and allows third parties to independently develop micro-scheduler servers.

4. The testing automation platform according to claim 1, wherein the assigned goal of one of the plurality of micro-scheduler servers is identifying submitted changelists causing a breakage or failed test.

5. The testing automation platform according to claim 1, wherein the assigned goal of one of the plurality of micro-scheduler servers is identifying changelists which caused a breakage and/or identifying changelists causing an unstable codebase.

6. The testing automation platform according to claim 1, wherein the assigned goal of one of the plurality of micro-scheduler servers is identifying flaky tests.

7. A method for scheduling and/or rescheduling tests for execution in a continuous integration environment, the continuous integration environment including a code repository and at least one continuous integration server that periodically generates software builds based on committed code changes, executes queued tests on the generated builds, and reports results to developers, the method comprising:
   queuing, by a first processor of a test scheduler server, tests to be run on a build based on code changes committed to the code repository, wherein a committed code change comprises a previously temporary code change that has been made permanent;
   listening, by second processors of each of a plurality of micro-scheduler servers, to at least one information stream from the continuous integration environment;
   analyzing, by the second processors, information received from the at least one information stream based on predefined rules designed to achieve an assigned goal, wherein each micro-scheduler server is assigned a respective goal;
   identifying, by the second processors, one or more target tests based on the analysis of the information received from the at least one information stream;
   assigning, by the second processors, a priority level to each of the identified one or more target tests based on the micro-scheduler server's respective assigned goal;

selectively creating, by the second processors, test execution requests for one or more of the identified target tests based on the assigned priority levels;

providing, by the second processors, the test execution requests to a micro-scheduler service;

receiving, by a third processor of a micro-scheduler service, the test execution requests from the plurality of micro-scheduler servers;

determining, by the third processor, an amount of system resources available to each micro-scheduler server;

selecting, by the third processor, which tests to queue for execution based on the amount of available resources for each respective micro-scheduler server and the assigned priority levels of the received test execution requests; and providing, by the third processor, the selected tests to the test scheduler server to be queued for execution by the continuous integration server.

8. The method according to claim 7, wherein the assigned goal of one micro-scheduler server is identifying areas of code in submitted changelists causing a breakage or failed test.

9. The method according to claim 7, wherein the assigned goal of one micro-scheduler server is identifying changelists which caused a breakage or errors within a submitted changelist causing an unstable codebase.

10. The method according to claim 7, wherein the assigned goal of one micro-scheduler server is identifying flaky tests.

* * * * *